(12) United States Patent
Simon

(10) Patent No.: US 7,677,185 B2
(45) Date of Patent: Mar. 16, 2010

(54) METHOD AND SYSTEM FOR TREATING CHEMICAL WASTE

(75) Inventor: Yehuda Yuri Simon, Omer (IL)

(73) Assignee: E.S.T. Ecological Systems Ltd., Beer Sheva (IL)

( * ) Notice: Subject to any disclaimer, the term of this patent is extended or adjusted under 35 U.S.C. 154(b) by 605 days.

(21) Appl. No.: 10/596,690

(22) PCT Filed: Apr. 11, 2005

(86) PCT No.: PCT/IL2005/000385

§ 371 (c)(1),
(2), (4) Date: Jun. 21, 2006

(87) PCT Pub. No.: WO2006/021945

PCT Pub. Date: Mar. 2, 2006

(65) Prior Publication Data

US 2007/0114119 A1    May 24, 2007

(51) Int. Cl.
*F23G 5/10*    (2006.01)
*F23G 7/04*    (2006.01)

(52) U.S. Cl. .................. 110/250; 110/238; 110/229; 110/185; 588/311; 588/321

(58) Field of Classification Search .......... 110/250, 110/229, 165 R, 185, 186, 238; 588/900, 588/311, 321; 219/121.36; 373/22
See application file for complete search history.

(56) References Cited

U.S. PATENT DOCUMENTS

| | | | | |
|---|---|---|---|---|
| 3,611,954 A | * | 10/1971 | Monroe, Jr. ............... | 110/238 |
| 3,708,409 A | | 1/1973 | Bainbridge | |
| 4,223,614 A | * | 9/1980 | Barkhuus et al. .......... | 110/238 |
| 4,644,877 A | * | 2/1987 | Barton et al. ............. | 588/311 |
| 4,886,001 A | * | 12/1989 | Chang et al. ............. | 110/250 |
| 4,909,164 A | | 3/1990 | Shohet et al. | |

(Continued)

FOREIGN PATENT DOCUMENTS

WO    WO 03/066197    8/2003

(Continued)

OTHER PUBLICATIONS

International Search Report PCT/IL2005/000385.

(Continued)

*Primary Examiner*—Kenneth B Rinehart
*Assistant Examiner*—David J Laux
(74) *Attorney, Agent, or Firm*—Martin Fleit; Paul D. Bianco; Fleit Gibbons Gutman Bongini & Bianco, PL (57) ABSTRACT

The invention is a system and method for neutralizing fluid chemical waste products that result from a chemical production process and are collected from the production line. The invention comprises a pyrolysis/reaction chamber into which the fluid chemical waste is pumped through an atomizer. The jet of small droplets of liquid waste that is formed by the atomizer effectively contacts the plasma stream created by a plasma torch. When the droplets contact the plasma stream the molecules of the waste from which the droplets are composed are dissociated into atoms and/or ions. These atoms and ions move out of the immediate region of the plasma stream and recombine to form a mixture of product gases which exits the chamber. The product gases then enter a post-pyrolysis subsystem, which is designed to neutralize and/or collect the components comprising the mixture of product gases.

19 Claims, 6 Drawing Sheets

U.S. PATENT DOCUMENTS

| | | | |
|---|---|---|---|
| 4,980,092 A | | 12/1990 | Pineau et al. |
| 5,222,448 A | * | 6/1993 | Morgenthaler et al. ...... 110/250 |
| 5,363,781 A | | 11/1994 | Chang et al. |
| 5,484,978 A | | 1/1996 | Hedberg et al. |
| 5,615,627 A | * | 4/1997 | Marr, Jr. ..................... 110/250 |
| 5,798,496 A | | 8/1998 | Eckhoff et al. |
| 5,935,293 A | | 8/1999 | Detering et al. |
| 6,372,156 B1 | | 4/2002 | Kong et al. |
| 6,938,562 B2 | * | 9/2005 | Pope .......................... 110/229 |
| 6,971,323 B2 | * | 12/2005 | Capote et al. ............... 110/250 |
| 2004/0043721 A1 | | 3/2004 | Imafuku et al. |

OTHER PUBLICATIONS

International Preliminary Report on Patentability PCT/IL2005/000385.

Written Opinion of the International Search Authority PCT/IL2005/000385.

\* cited by examiner

METHOD AND SYSTEM FOR TREATING CHEMICAL WASTE

FIELD OF THE INVENTION

The present invention is related to the field of chemical production lines. In particular the invention relates to providing a solution to the problem of safely disposing of the chemical waste products that result from the production process and are collected from the production line.

BACKGROUND OF THE INVENTION

Many processes used in the chemical industry produce chemical waste, which at room temperature may be gaseous, liquid, or solid. There are many known methods to treat and discard gaseous and liquid waste. Treatment of gaseous waste, for obvious reasons is generally carried out at the point of their creation. Liquid waste can sometimes be carried out in the production facility, but very often the waste products are stored in containers and transported to another site for treatment. Waste that solidifies when held at ambient temperature (hereinafter solid waste) is also usually packed in containers that are then transported to special facilities for long-term storage or treatment such as by combusting in combustion plants. Disposal of this industrial chemical waste is very expensive since it requires special packaging materials, handling equipment, and storage areas. More importantly the present methods results in large quantities of harmful chemicals being stored each year around the world. The ecological problems both actual and potential caused by the disposal, transport, and storage of chemical waste are well know and, as a result of environmental protection treaties and laws and pressure exerted by oversight groups both governmental and private, considerable resources are expended by the chemical industry to treat the waste that is created as an unwanted byproduct of the production processes.

The term "neutralized" as used herein means the conversion of an ecologically harmful substance to a form that can be safely stored or released to the surroundings without causing damage to or being a threat to the environment. One of the most effective methods of neutralizing harmful chemical waste is high temperature pyrolysis of the raw waste material. As opposed to simply burning the waste, in a pyrolytic process the waste is reduced to atoms and ions, which upon cooling, react with each other and possibly other molecules and ions and recombine to form less harmful products that can be safely disposed of or used.

A typical arrangement for pyrolytic treatment of liquid chemical wastes is described in U.S. Pat. No. 4,644,877. In the apparatus described in this patent, the liquid waste is introduced directly into the interior zone of the cylindrical co-axial electrodes of a plasma torch. The waste material undergoes pyrolysis inside the torch. The resulting atoms and ions exit in the plasma stream into a reaction chamber where they begin to cool and recombine forming a mixture of gases and solid particles that pass to post-pyrolysis means where they are cooled and separated. The non-toxic gases are typically burned and either released to the atmosphere or used as fuel. The solid matter is disposed of in an unspecified manner.

U.S. Pat. No. 5,798,496 describes a portable waste disposal unit wherein a rotary kiln comprising at least one plasma gun and one or more movable target electrodes is mounted on a truck so that the unit can be easily transported to a waste site. The unit is designed to treat solid and/or liquid waste. Once the torch is activated to produce a plasma stream, the impedance in series with the torch anode is adjusted to create a "drawn arc" from the torch cathode to the one or more secondary anodes, thereby creating a hot zone in front of the plasma torch in which vitrification, pyrolysis, and gasification of the waste takes place.

It is a purpose of the invention to provide a plasma torch based processing system for converting hazardous fluid chemical waste into products that can either be reused or disposed of safely without creating a threat to the environment.

It is another purpose of the invention to provide a plasma torch based processing system that can be either permanently or temporarily attached to a process line in a chemical production facility for on-line treatment of the waste products as they are formed.

Further purposes and advantages of this invention will appear as the description proceeds.

SUMMARY OF THE INVENTION

In a first aspect, the invention is a system for neutralizing fluid chemical waste products that result from a chemical production process and are collected from the production line. The system of the invention comprises:

A pyrolysis/reaction chamber having three or more openings. One or more plasma torches are inserted into the openings, one or more inlet conduits pass through them, and an exit conduit is connected to one of them.

A pre-pyrolysis subsystem comprising a container to collect the waste, a valve to regulate the flow rate, and a pump, which pumps the waste from the container through the inlet conduits.

A post-pyrolysis subsystem.

Sensors that provide information concerning various operating parameters at different locations in the system A control unit that utilizes information provided by the sensors as well as other information provided to it from other sources in order to allow optimization and automation of the operation of the system. and A display system to provide the operator of the system with information concerning the operation and operating parameters of the system.

Each of the inlet conduits has an atomizer attached at its end pointing into the chamber and each of the atomizers is located such that the jet of small droplets that is formed when the liquid waste supplied by the pre-pyrolysis means is pumped through the atomizer effectively contacts at least one of the plasma stream/s created by the plasma torch/es. When the droplets contact the plasma stream the molecules of the waste from which the droplets are composed are dissociated into atoms and/or ions. The atoms and ions move out of the immediate region of the plasma stream and recombine to form a mixture of product gases which exits the chamber through the exit conduit. The product gases then enter the post-pyrolysis subsystem, which is designed for neutralizing and/or collecting the components comprising the mixture of product gases.

The fluid chemical waste products can be liquid, gas, or solids dissolved in a solvent to form a stable solution.

The system of the invention can be located in the vicinity of the end of the production line, in which case the fluid chemical waste products are neutralized immediately after they exit the production line. Alternatively the fluid chemical waste products can be temporarily stored after they exit the production line and then neutralized. In a preferred embodiment, the system of the invention can be transported from location to location.

In a preferred embodiment the pyrolysis/reaction chamber is a double-walled chamber, which is cooled by water circulating through the space between the walls. Preferably the walls of the chamber are made of stainless steel. In another embodiment, the pyrolysis/reaction chamber has a metal wall, which is lined on the inside with refractory material.

The temperature of the plasma stream can be adjusted by, the either adjusting the distance between the electrodes, adjusting the value of the current flowing between the electrodes, or both. The system of the invention comprises means for making these adjustments. In a preferred embodiment of the system the adjustment of the current can be carried out while the torch is operating.

The energy requirement of the plasma torch/es can be determined from the disassociation energies of the molecules of which the waste is comprised. The composition of the gases that comprise the mixture of product gases is calculated using principles of kinetic equilibrium and the results of the calculation are used to design the post-pyrolysis subsystem.

The control system has one or more of the following capabilities: to act as an input unit to the system, to store information, and to perform computations.

A preferred embodiment of the system of the invention has been designed for treatment of chemical waste products for which a major component is comprised of bromine or bromine products, particularly chemical waste products result from the production of tetrabromobisphenol A (TBBA).

In some embodiments of the system of the invention, the post-pyrolysis subsystem comprises a particle trap to remove any solid particles from the mixture of product gases. The post-pyrolysis subsystem may comprise a radiation cooler to rapidly reduce the temperature of the mixture of product gases. In a preferred embodiment, the post-pyrolysis subsystem comprises at least one spray tower in which at least one of the components of the mixture of product gases is dissolved in water. In this embodiment, the post-pyrolysis subsystem comprises elements for collecting the solution comprising at least one of the components of the mixture of product gases dissolved in water and for recycling the solution through the spray tower repeatedly until the concentration of the component in the solution reaches a predetermined value.

In preferred embodiments of the invention the post-pyrolysis subsystem comprises monitoring equipment to measure the composition of the mixture of product gases at selected locations.

In another aspect, the invention is a method for neutralizing fluid chemical waste products that result from a chemical production process and are collected from the production line. The method comprises the steps of:

providing a system according to claim 1;

activating the plasma torch to produce a plasma stream having a predetermined temperature;

activating the pre-pyrolysis subsystem to cause the waste to flow through the atomizer thereby creating droplets which effectively contact the plasma stream and dissociating the molecules of the waste into atoms or ions;

creating predetermined conditions of temperature and concentration of the atoms and ions such that predetermined chemical reactions take place thereby forming a gaseous mixture of recombination products; and activating the post-pyrolysis means to neutralize at least some of the recombination products so that they may be safely released to the surroundings and/or to collect the recombination products.

In preferred embodiments of the method of the invention, the fluid chemical waste products can be in the form of liquids, gases, or solids that have been dissolved in a solvent to form a stable solution.

The method of the invention is preferably carried out in the vicinity of the end of the production line and the fluid chemical waste products are preferably neutralized immediately after they exit the production line. However under some circumstances, the fluid chemical waste products are temporarily stored after they exit the production line and then neutralized using to the method of the invention.

The method of the invention can advantageously be used to neutralize chemical waste products of which a major component is bromine or bromine products. In particular, the method of the invention is well suited to the neutralization of chemical waste products resulting from the production of tetrabromobisphenol A (TBBA).

All the above and other characteristics and advantages of the invention will be further understood through the following illustrative and non-limitative description of preferred embodiments thereof, with reference to the appended drawings.

DETAILED DESCRIPTION OF PREFERRED EMBODIMENTS

Figure 1:
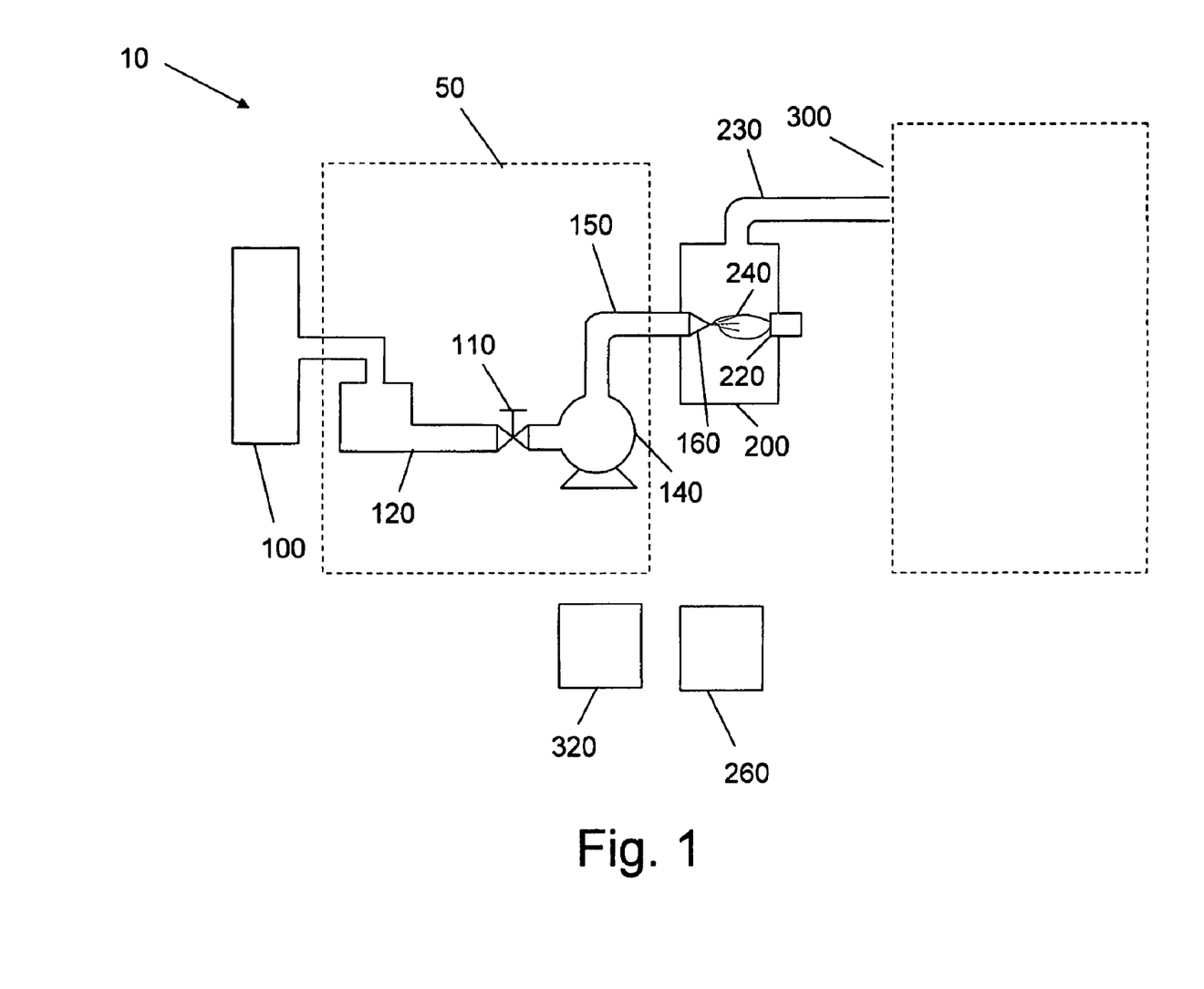
FIG. 1 is a schematic diagram of the system the present invention.

In FIG. 1 is schematically shown the system 10 for treating chemical waste according to the present invention. Block 100 represents a conventional industrial production line used to produce a particular chemical. The production of the desired product typically is carried out on a continuous processing line. The entire process may be a "one pot" process or may involve many steps involving separation of intermediate products from secondary products or waste, addition of more raw material, and provision of the proper conditions for the production of the next intermediate product. Each step is typically accompanied by the production of waste products, which must eventually be disposed of and the process continues until the final desired product is collected at the end of the production line.

Container 120 represents a collection and/or temporary storage facility at the end of the production line into which all of the accumulated waste is collected. This representation is symbolic and many other arrangements can be used, including several collection points from which the waste is transported to the waste treatment system. In sufficiently large production facilities more than one system of the invention may be provided at critical locations along the production line. In any case, a pre-pyrolysis subsystem 50 symbolically represented by container 120, valve 110, and pump 140, supplies the waste from container 120 at constant rate through entrance conduit 150 to an atomizer 160 that is inserted through an opening in the wall of a pyrolysis/reaction chamber (also referred to herein as the reactor) 200. The rate at which the waste enters the reactor 200 must be constant in order to insure stabile and predictable operation of the system. Therefore a control unit 260 is present to allow optimization and automation of the operation of the pre-pyrolysis subsystem 50, thereby allowing it to compensate for fluctuations in waste input flow that are associated with fluctuations in the production line. Pump 140 is a variable speed pump whose throughput can be adjusted by control unit 260. The exact value of the flow rate along with proper selection of the size of the hole in the nozzle of the atomizer 160 and the pressure in conduit 150 must be determined and maintained constant for each specific combination of the composition of the waste and properties of the plasma stream.

Inside reactor 200 the waste is brought into contact with the plasma current (stream) 240 produced by plasma torch 220 and pyrolysis of the waste takes place. As the resultant atoms and ions drift out of the immediate region of the plasma stream 240, they begin to cool and recombine to form a variety of gaseous products that exit the reactor through exit conduit 230. The gaseous mixture in conduit 230 is further cooled by conduction of heat to the surrounding air. The mixture of recombination product gases, which may also carry along some particulate matter, enters post-pyrolysis subsystem 300 wherein the various components of the mixture are separated and/or neutralized. The exact components and structure of subsystem 300 will be discussed hereinbelow and depend on the nature of the products supplied through exit conduit 230, which in turn depend on the chemical composition of the waste in container 120 and the conditions in the reaction chamber 200.

Figure 2:
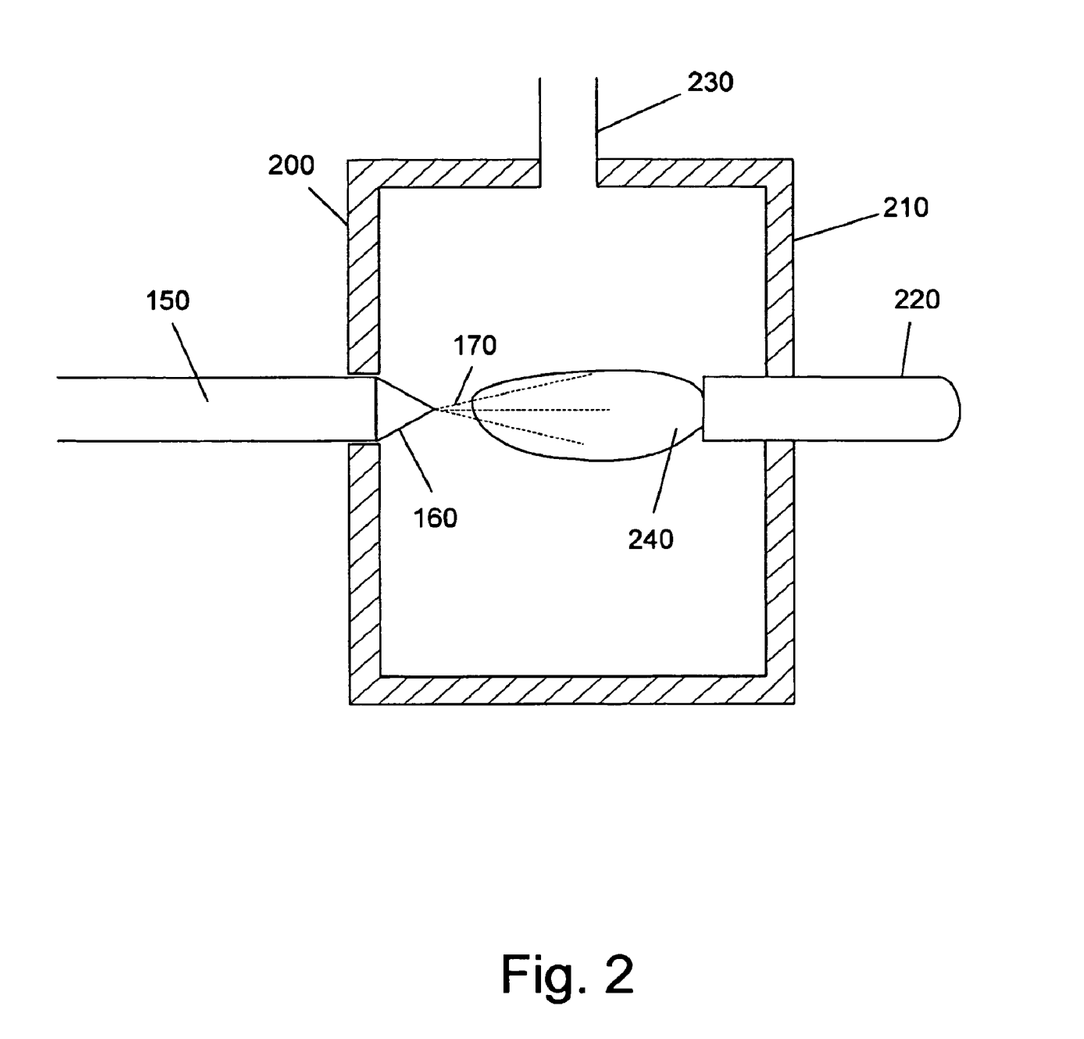
FIG. 2 is a general description of a pyrolysis reactor in accordance with the present invention.

Turning now to FIG. 2, we see an enlarged view of pyrolysis/reaction chamber 200. The reactor 200 is a double walled metal chamber. The walls are preferably made of material such as stainless steel and the inner wall in particular must be made from a material that is resistant to the heat inside the reactor and to corrosion by the gases produced. Water is circulated in the space between the two walls to provide cooling. In other embodiments, the reactor could have a metal outer wall lined on the inside with refractory material.

The walls of chamber 200 have at least three openings: the first is in a side wall, through which a plasma torch 220 is inserted; inlet conduit 150 passes through the second opening, which is in the side wall facing the first opening; and outlet conduit 230 is connected to the third opening in the top of reactor 200. Each of the openings is hermetically and thermally sealed around the conduit and/or torch that pass through it to limit heat loss and prevent the release of gases from inside of the reactor directly into the surroundings.

The design of the reactor 200 shown in FIG. 2 is for illustrative purposes only and other alternatives are contemplated which will be designed for specific circumstances. For example two or more atomizers 160 and/or plasma torches 220 can be provided. Additionally the waste may comprise inorganic compounds such as metallic salts and some of the recombination products formed after pyrolysis may be solids, therefore in these cases outlets would have to be provided in the chamber to allow for the removal of liquid metals and/or solids.

Plasma torch 220 is of conventional design. It is water cooled and produces the plasma current/stream 240 from an electric arc that is created between two electrodes, e.g. two coaxially mounted hollow electrodes separated by an electrically insulating material, and a plasma forming gas that is caused to flow through the center of the torch. The plasma temperature can be controlled either by changing the distance between the two electrodes or by controlling the current flow between them. The distance between electrodes is set manually before operation, but the current can be controlled either manually or automatically during operation of the torch by means of control unit 260, thereby allowing adjustment of the temperature of the stream 240. The exact parameters and size of the plasma torch are chosen to match the composition and flow rate of the waste to be processed in order to insure most efficient use of the energy supplied to the torch. The energy requirements of the torch can be accurately estimated from calculations based on the disassociation energy of the molecules of which the waste is composed. Typical operating temperatures in plasma stream 240 are between about 2,000° C. and about 10,000° C.

Fluid waste, generally liquid, enters the reactor 200 via an atomizer 160, which is attached to the end of inlet conduit 150 facing into the interior of the reactor 200 opposite the plasma stream 240. The atomizer 160 atomizes the liquid waste creating a jet of small droplets that enter the plasma stream 240. This arrangement provides the conditions for effective contact of the droplets with the plasma stream, meaning that the conditions are such that the molecules of which the droplets are comprised will be instantaneously dissociated into their constituent atoms or ions. Inside the reactor, there is a large temperature gradient and as the atoms and ions move out of the immediate region of the plasma stream they enter cooler regions in which the thermodynamic conditions allow them to recombine to form the gas phase of different types of stable molecules. The gas mixture comprised of these recombined molecules rises to the top of the chamber and exits the reactor 200 via exit conduit 230.

Various parameters characterizing the condition of the reactor 200 are measured by sensors, and the measurement results are shown on a display 320 (see FIG. 1), that is preferably positioned near the control unit 260. The control unit can be a personal computer or a dedicated unit designed especially for use with the system of the invention. Control unit 260 has several functions: one of which is to function as an input unit to allow either manual or automatic sending of activation instructions to various components of the system, for example to operate pumps, open/close electronic valves, adjust the temperature inside the reactor 200, etc. Control unit 260 should also comprise storage abilities to allow recording of input from the sensors for later use as well as storage of operating instructions (software). Control unit 260 should also preferably have computational abilities, which will allow optional automatic operation of the system without the necessity of human intervention. The display 320 may display the measured data digitally, for instance on a computer monitor, or can at least partially comprise an analog display, such as that provided by meters having moving needles. Plasma temperature is calculated from data collected on waste composition, flow rate into the reactor, and plasma torch 220 operating parameters, i.e. plasma forming gas flow rate, inter-electrode distance, and voltage is displayed on display device 320. All the operating parameters are measured by suitable sensors (not shown) and displayed on display 320, thereby allowing an operator to understand the source of and to control temperature fluctuations if and when they occur.

As a specific example, which is provided merely to illustrate the invention and is not intended to limit the scope of the invention in any manner, a production line for the production of tetrabromobisphenol A (TBBA) will now be considered. At the end of the production line, the TBBA is accompanied by liquid waste products at approximately 80° C. In existing facilities for the production of TBBA, the waste products are diverted into drums in which they cool and solidify. The drums are then removed from the chemical plant and transported to a chemical storage area, where they present a serious ecological threat. Analysis of the waste reveals that its approximate wt/wt % composition is: 30% carbon; 57% bromine; 0.2% chlorine; 0.3% sulfur; 2.2% hydrogen; 6.0% oxygen; and 4.5% other elements.

If a system of the invention were provided at the end of the production line, then the liquid waste would be pumped towards the atomizer before its temperature fell to the point at which it solidified. After passing through the atomizer 160 the fine spray comprised of droplets of waste comes in contact with the plasma having temperature of about 3000° C. Pyrolysis of the droplets takes place resulting in production of ions and atoms of the various elements according to the above concentration. The plasma working gas in this case is air. Therefore to the mix of particles are added nitrogen and oxygen atoms and ions from the plasma. As the mixture of particles starts to cool down, new compounds are formed as a result of the recombination of the atoms and ions. The identity of the recombination reactions is predictable from calculations based on kinetic equilibrium.

In the case of the present example the principal recombination reactions are:

a) $C^{4+}+2O^2-\rightarrow CO_2-Q$
b) $2H^++3OO^2-\rightarrow H_2O-Q$
c) $H^++Br \rightarrow HBr-Q$.

The nitrogen ions recombine to form $N_2$ and minor amounts of HCl and possibly other compounds are produced. From the reactor 200 and exit conduit 230 the mixture of HBr, $CO_2$, $H_2O$ pass into post-pyrolysis subsystem 300, where the HBr (and HCl, if present) is absorbed in water and separates from the mixture of gases and the other gases are treated to the point where they meet relevant ecological standards and can be released into the air. If analysis of the gas at the exit of post-pyrolysis subsystem 300 reveals the presence of harmful substances, then this is an indication that the operating parameters of pre-pyrolysis subsystem 50, atomizer 160, and plasma torch 220 must be checked and adjusted.

Figure 3:
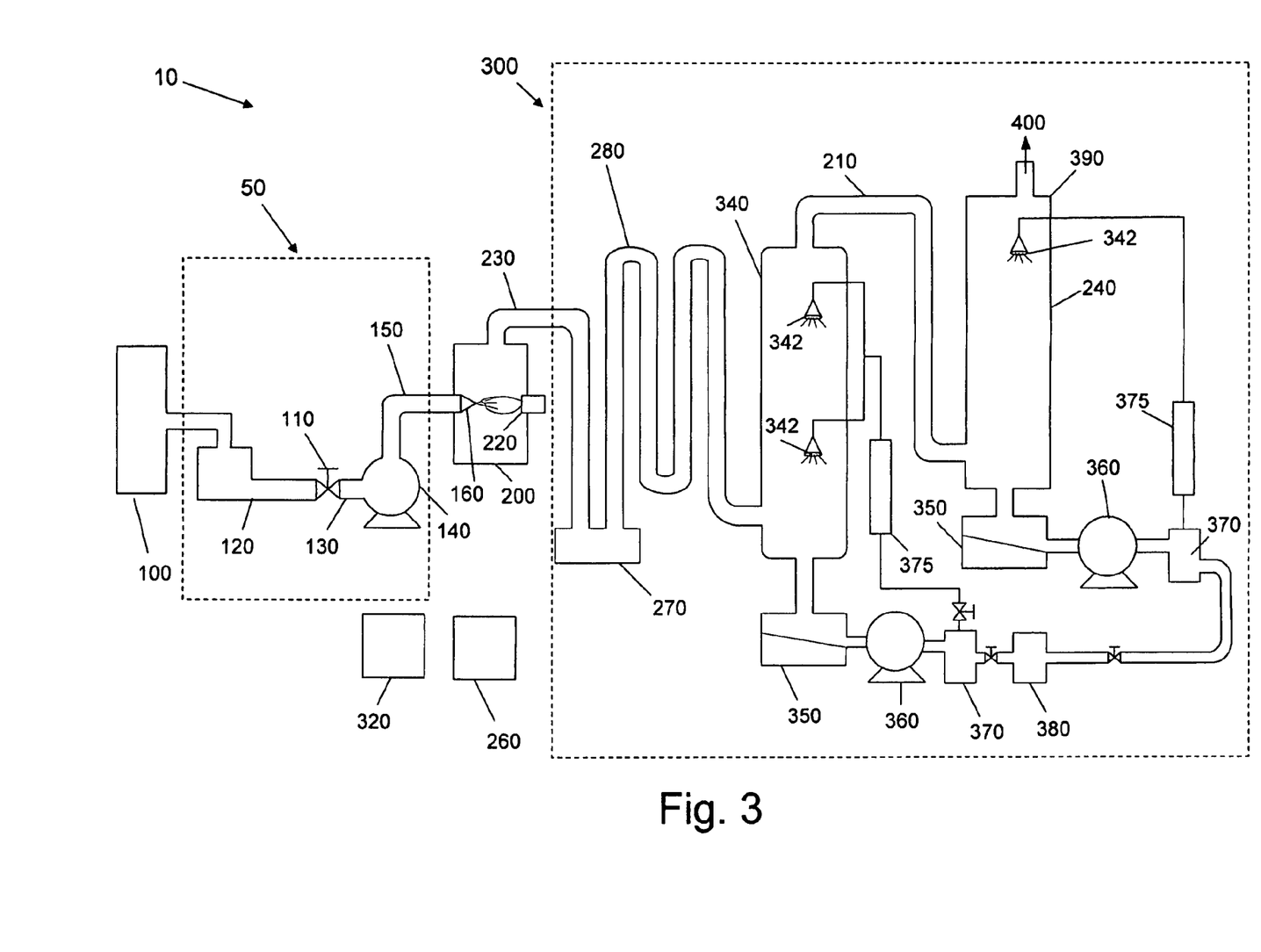
FIG. 3 schematically shows a post-pyrolysis subsystem according to the invention.

Referring to FIG. 1, after exiting the reactor 200 through exit conduit 150, the mixture of gases passes into the post-pyrolysis subsystem 300. The post-pyrolysis subsystem 300 shown in FIG. 3 is provided merely to illustrate the invention and is not intended to limit the scope of the invention in any manner. The subsystem shown in FIG. 3 has been designed and built by the inventor of the present invention to treat the waste products that accumulate at the end of a production line for the production of TBBA.

Upon entering post-pyrolysis subsystem 300, the mixture of gases first passes through particle trap 270, where any solid matter that may be present is separated from the gas stream. After exiting particle trap 270, the mixture of gases flows through radiation cooler 280 wherein its temperature is reduced rapidly reduced in order to prevent the formation of undesirable gases such as dioxins. The cooled gas stream then enters the bottom of spray tower 340. Inside the spray tower is an arrangement of nozzles 342 that are arranged to fill the interior of spray tower 340 with a fine mist/rain of water droplets. Shown in FIG. 3 are only some of the components of the water system comprising pumps, filters, valves, etc. that maintain the water temperature at 60° C. and recycle it throughout all of post-pyrolysis subsystem 300. The water vapor that was in the gas mixture that exited reactor 200 condenses to the liquid state and is added to the circulating water stream. As the gas mixture containing HBr, $CO_2$, and traces of other gases rises through the water droplets inside spray tower 340, the water soluble HBr dissolves in the water and falls to the bottom of the spray tower 340 and is collected in collection vessel 350. The $CO_2$ and any other non-water soluble gases exit the top of spray tower 340 and continue to a second, backup, or ecological, spray tower 390 where they are further purified and any HBr that was not removed from the gas stream in the first tower is collected in collection vessel 350 at the bottom of spray tower 390. Not shown in FIG. 3 are further elements that might be present including filters, additional scrubbers, and monitoring equipment to keep track of the composition of the gas stream. Eventually, when it is determined that the relevant ecological standards have been met, the CO2 is released to the atmosphere as indicated by arrow 400.

The HBr solution that is collected in collection vessels 350 is pumped by means of pumps 360 through filters 370. After filtration, the HBr $ABI_2O$ solution is pumped to the nozzles 342 and sprayed into the towers again in order to increase the concentration of HBr. Because a great deal of heat is released when HBr is dissolved in water, the solution is pumped through heat exchanger 375 before being reintroduced into tower 340 of 390. Eventually the solution in vessel 350 contains HBr at the desired concentration (in the case of this example greater than 40%) and the HBr solution is then collected in collection vessel 380. The contents of vessel 380 can be returned to the beginning of the production line and introduced as part of the raw materials in the production of bromine compounds.

In addition to measuring parameters characterizing the condition of the reactor 200 many sensors (not shown or further described) are provided to measure the conditions in the post-pyrolysis subsystem 300. For example, the temperature of the cooling fluid circulating in the spray towers 340 and 390, the temperature of the pyrolysis products at different stages (for instance, at the exit of the reactor 200, at the inlet and outlet of radiation cooler 280), the pressure at various positions in the system, etc. All of this data is inputed into controller 260 and displayed on display device 320 in order to allow control of the process, either automatically or manually.

The advantages of the application of the present invention to the production of TBBA are obvious from the above description. First and foremost, the problems and expense related with collecting, transporting, and safely storing the waste products are minimized and/or eliminated. Secondly, the invention makes possible the recovery of large quantities of HBr that can be used instead of being discarded as is presently done.

Figure 4:
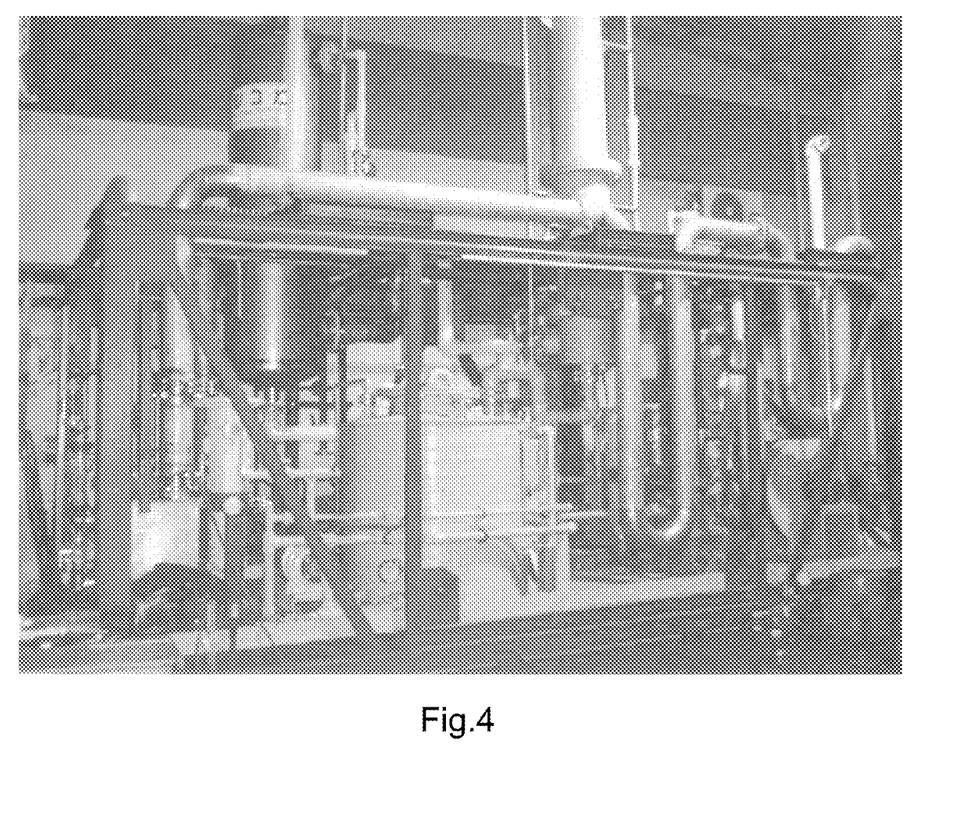
FIG. 4 to FIG. 6 are photographs showing different views of a system according to the present invention.
Figure 5:
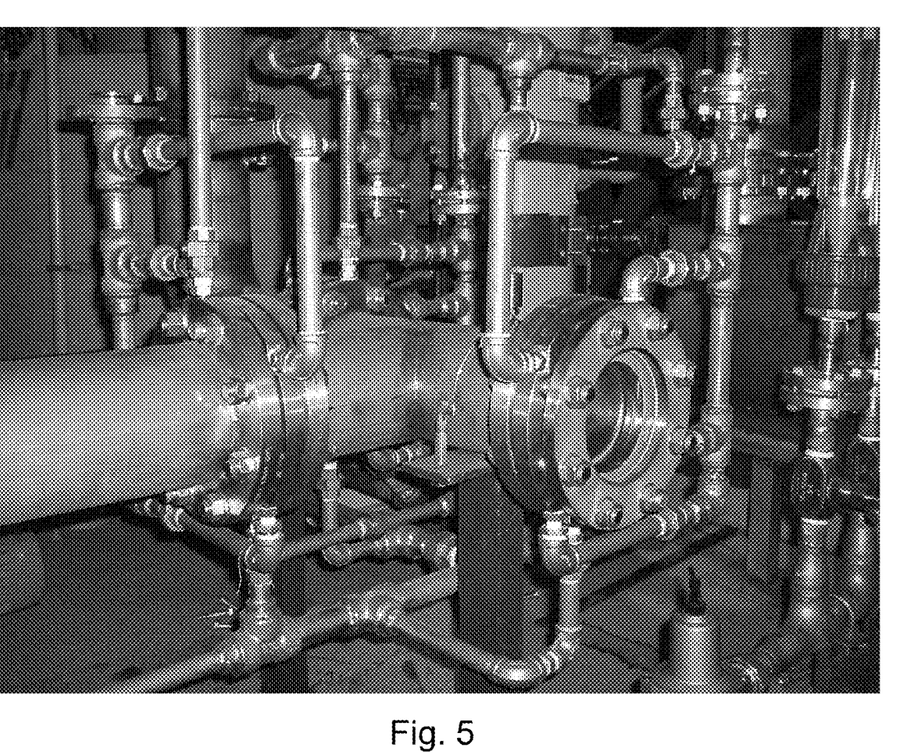
Figure 6:
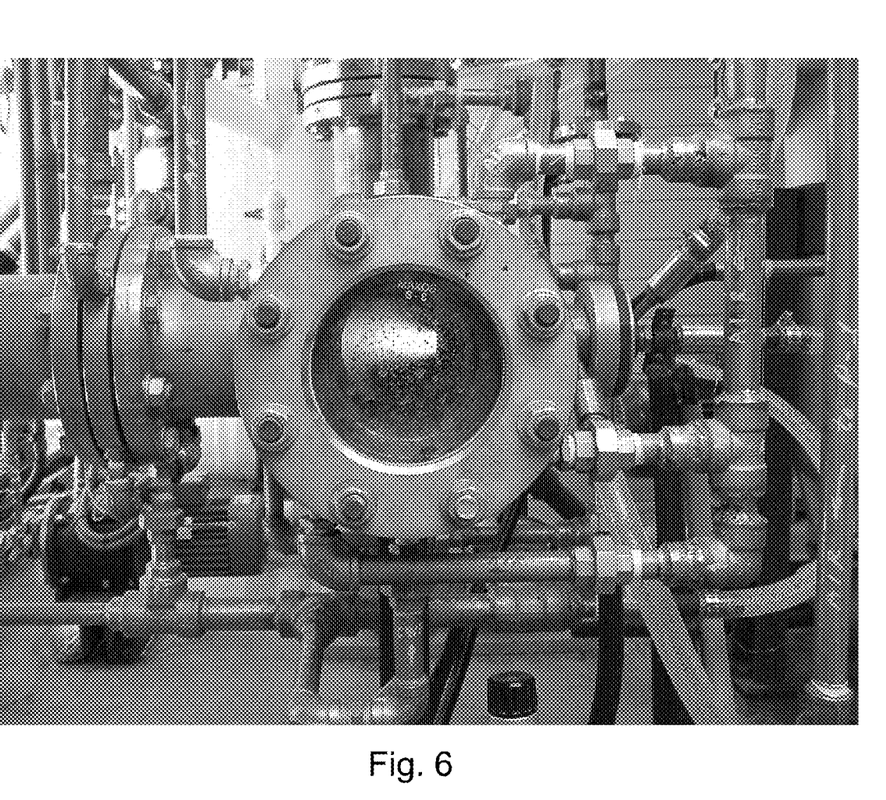

FIG. 4 to FIG. 6 are photographs showing different views the system described above that has been built to treat the waste from a TBBA production line. FIG. 4 is an overall view of the system. FIG. 5 and FIG. 6 are close-up views showing the reactor which has been provided with a flange comprising a glass window for viewing the interior of the chamber. In FIG. 6 the plasma torch (manufactured by Plasmactor Co. Ltd. Minsk Belarus) is shown on the right connected to its air, water, and electricity lines. The waste enters the reactor through a small diameter pipe that is inside the large pipe on the right side of the reactor. At the end of the small diameter pipe is an atomizer manufactured by Spray Systems Inc. of California, USA. Looking into the chamber through the window, the plasma stream is clearly visible.

In order to obtain a feeling for the operating conditions, in one test of the system the temperature inside the plasma stream 240 was calculated to be 3000° C., the temperature was measured to be 830° C. inside the reactor at the entrance to conduit 230, 120° C. at the exit from radiation cooler 280, and 60° C. inside spray tower 340. The water cooling of the reactor was so effective that the outside surfaces of reactor 200 could be touched with a bare hand without discomfort while the torch was operating.

The system of the invention may be used with various production lines, to treat various types of waste, wherein a particular composition of waste produced by each production line requires treatment at different flow rates and temperatures. Gas phase waste products can be fed directly into the plasma stream and solid waste that can be dissolved in a solvent to form a stable liquid solution can also be treated by the system of the invention. In each case, the chemical composition of the waste can be analyzed and the expected recombination products determined using calculations of the kinetic equilibrium. The nature of the recombination products can be influenced by the control of factors such as the plasma temperature and the choice of plasma forming gas. For example, steam can be used as the plasma gas in cases where it is necessary to increase the concentration of $H^+$ ions in order to encourage certain desired recombination reactions to take place. The energy that must be supplied by the plasma torch can be calculated using the known disassociation energies of the molecules in the waste. Additionally, the post-pyrolysis subsystem must be modified mutatis mutandis to enable collection and or neutralization of the recombination products. Skilled persons will easily be able to devise appropriate modifications to the system described herein in order to apply the invention to other chemical production lines.

While the system of the invention has been described as being installed at the end of the production line, the entire system shown in FIG. 4 has been mounted on a truck and moved from location to location. If the amount of waste produced at a particular chemical factory does not justify a permanent installation, then the waste can be stored on site and either the portable system could be brought periodically to the plant or the waste could be transported to a central location for processing.

Although embodiments of the invention have been described by way of illustration, it will be understood that the invention may be carried out with many variations, modifications, and adaptations, without departing from its spirit or exceeding the scope of the claims.

The invention claimed is:

1. A system for neutralizing liquid and gas phase chemical waste products that result from a chemical production process and are collected from the production line, said system comprising:
   a pyrolysis/reaction chamber having opposed first and second facing side walls and a top wall, and having at least one first opening in the first facing side wall, a plasma torch having electrodes inserted through each said opening in the first facing side wall for creating a plasma in said chamber directed toward said second facing wall, at least one second opening in the second facing side wall oriented toward the plasma torch, and a third opening in the top wall of said chamber;
   electrical means for supplying current and voltage to the plasma torch for generating plasma in the chamber;
   a pre-pyrolysis subsystem comprising a first inlet to receive liquid and gas phase chemical waste products from a chemical production line; a first inlet conduit connected to said first inlet and to each second opening in said second facing wall; a valve connected to regulate the flow rate in the first inlet conduit, and a variable speed pump to pump chemical waste products from said first inlet through said first inlet conduit to each said second opening in said second facing wall and into said pyrolysis/reaction chamber;
   a post-pyrolysis subsystem comprising an exit conduit connected to said third opening in the top wall of said chamber, and means connected to said exit conduit for separating and/or neutralizing various components of gaseous mixture that exits said pyrolysis/reaction chamber through said third opening;
   a plurality of sensors for sensing and outputting signals indicative of a plurality of system parameters selected from the group consisting of pressure in an inlet conduit; flow rate in an inlet conduit; current being applied to said plasma torch, voltage of said plasma torch, inter-electrode distance of a plasma torch, interelectrode distance between a plurality of plasma torches; flow rate of plasma forming gas; temperature of gas stream in said post-pyrolysis subsystem, pressure of gas stream in said post-pyrolysis subsystem, and composition of gas stream in said post-pyrolysis subsystem;
   a control unit for storing information and performing computations responsive to signals output by the plurality of sensors to control the system by maintaining a constant flow rate of waste into said pyrolysis/reaction chamber; adjusting the flow rate of plasma forming gas, maintaining a predetermined plasma temperature; and optimizing the operation of said post-pyrolysis system;
   a display system for displaying signals indicative of output by said sensors; and
   an atomizer attached to the end of each said inlet conduit connected to the second opening of the second facing side wall, said atomizer pointing into said chamber directly opposite said plasma torch for atomizing liquid and gas phase chemical waste being pumped through said inlet conduit as a jet of small droplets directly into plasma being created by the plasma torch, whereby the molecules of the jet of small droplets are instantaneously disassociated by the plasma into their constituent atoms or ions, which rise in the chamber toward the third opening in the top wall while recombining to form a gas phase of stable molecules, which exits the pyrolysis/reaction chamber via the third opening and is processed by the post-pyrolysis subsystem.

2. A system according to claim 1, wherein the post-pyrolysis subsystem is designed in accordance with the predetermined composition of the gases that comprise the mixture of product gases that pass through said exit conduit.

3. A system according to claim 1, wherein the pyrolysis/reaction chamber is a double-walled chamber, comprising a space between said walls through which water is caused to circulate, thereby cooling said pyrolysis/reaction chamber.

4. A system according to claim 3, wherein the walls of the chamber are made of stainless steel.

5. A system according to claim 1, wherein the pyrolysis/reaction chamber has a metal wall, which is lined on the inside with refractory material.

6. A system according to claim 1, wherein the post-pyrolysis subsystem comprises a particle trap to remove any solid particles from the mixture of product gases.

7. A system according to claim 1, wherein the post-pyrolysis subsystem comprises a radiation cooler to rapidly reduce the temperature of the mixture of product gases.

8. A system according to claim 1, wherein the post-pyrolysis subsystem comprises at least one spray tower comprising an entrance in its lower end and means for creating a downward spray of water droplets, whereby when the mixture of product gases is introduced into said spray tower through said entrance, said product gases will rise in said tower through said spray of water droplets, thereby dissolving at least one of the components of the mixture of product gases in water.

9. A system according to claim 8, wherein the post-pyrolysis subsystem comprises a storage vessel for collecting the solution comprising at least one of the components of the mixture of product gases dissolved in water, and a pump for recycling said solution through the means for creating the downward spray of water droplets in the spray tower until the concentration of said component in said solution reaches a predetermined value.

10. A system according to claim 1, wherein the post-pyrolysis subsystem comprises monitoring equipment to measure the composition of the mixture of product gases at selected locations.

11. A system according to claim 1, wherein said system has a size and weight that allow said system to be transported from location to location and placed in position at an appropriate place in an existing production line.

12. A method for using a system according to claim 1 for neutralizing liquid and gas phase chemical waste products that result from a chemical production process and are collected from the production line, said method comprising:

providing a system comprising: a pyrolysis/reaction chamber having opposed first and second facing side walls and a top wall, and having at least one first opening in the first facing side wall, a plasma torch having electrodes inserted through each said opening in the first facing side wall for creating a plasma in said chamber directed toward said second facing wall, at least one second opening in the second facing side wall oriented toward the plasma torch, and a third opening in the top wall of said chamber; electrical means for supplying current and voltage to the plasma torch for generating plasma in the chamber; a pre-pyrolysis subsystem comprising a first inlet to receive liquid and gas phase chemical waste products from a chemical production line; a first inlet conduit connected to said first inlet and to each second opening in said second facing wall; a valve connected to regulate the flow rate in the first inlet conduit, and a variable speed pump to pump chemical waste products from said first inlet through said first inlet conduit to each said second opening in said second facing wall and into said pyrolysis/reaction chamber; a post-pyrolysis subsystem comprising an exit conduit connected to said third opening in the top wall of said chamber, and means connected to said exit conduit for separating and/or neutralizing various components of gaseous mixture that exits said pyrolysis/reaction chamber through said third opening; a plurality of sensors for sensing and outputting signals indicative of a plurality of system parameters selected from the group consisting of pressure in an inlet conduit; flow rate in an inlet conduit; current being applied to said plasma torch, voltage of said plasma torch, inter-electrode distance of a plasma torch, inter-electrode distance between a plurality of plasma torches; flow rate of plasma forming gas; temperature of gas stream in said post-pyrolysis subsystem, pressure of gas stream in said post- pyrolysis subsystem, and composition of gas stream in said post-pyrolysis subsystem; a control unit for storing information and performing computations responsive to signals output by the plurality of sensors to control the system by maintaining a constant flow rate of waste into said pyrolysis/reaction chamber; adjusting the flow rate of plasma forming gas, maintaining a predetermined plasma temperature; and optimizing the operation of said post-pyrolysis system; a display system for displaying signals indicative of output by said sensors; and an atomizer attached to the end of each said inlet conduit connected to the second opening of the second facing side wall, said atomizer pointing into said chamber directly opposite said plasma torch for atomizing liquid and gas phase chemical waste being pumped through said inlet conduit as a jet of small droplets directly into plasma being created by the plasma torch, whereby the molecules of the jet of small droplets are instantaneously disassociated by the plasma into their constituent atoms or ions, which rise in the chamber toward the third opening in the top wall while recombining to form a gas phase of stable molecules, which exits the pyrolysis/reaction chamber via the third opening and is processed by the post-pyrolysis subsystem;

activating the plasma torch/es to produce a plasma stream having a predetermined temperature;

activating the pre-pyrolysis subsystem to cause said waste to flow through the atomizer/s thereby creating droplets which effectively contact said plasma stream/s whereupon the molecules of said waste dissociate into atoms or ions;

creating predetermined conditions of temperature and concentration of said atoms and ions such that predetermined chemical reactions take place; whereby, following the migration of said atoms or ions from the immediate region of said plasma stream/s, a gaseous mixture of recombination products is formed;

activating the post-pyrolysis means to neutralize at least some of said recombination products; and releasing said recombination products to the surroundings and/or collecting said recombination products.

13. A method according to claim 12, wherein the liquid or gas phase chemical waste products can be one or more of the types selected from the following group:
liquid;
gas; and
solid heated to its melting point or dissolved in a solvent to form a stable solution.

14. A method according to claim 12, wherein the system is located in the vicinity of the end of the production line and the liquid or gas phase chemical waste products are neutralized immediately after they exit said production line.

15. A method according to claim 12, wherein the liquid chemical waste products are temporarily stored after they exit the production line and then are neutralized.

16. A method according to claim 12, wherein a major component of the chemical waste products is comprised of bromine or bromine products.

17. A method according to claim 16, wherein the chemical waste products result from the production of tetrabromobisphenol A (TBBA).

18. A method according to claim 12, wherein the value of the current flowing between the electrodes of each plasma torch is adjusted while the torch is operating.

19. A method according to claim 12, wherein the energy requirement of the plasma torch/es is determined from the disassociation energies of the molecules of which the waste is comprised.

* * * * *